Dec. 6, 1960  H. D. SWARTZ  2,963,072
THERMOPLASTIC WELDING DEVICE
Filed Nov. 23, 1955  2 Sheets-Sheet 1

INVENTOR.
Henry D. Swartz
BY Gerald Altman
ATTORNEY

Dec. 6, 1960  H. D. SWARTZ  2,963,072
THERMOPLASTIC WELDING DEVICE
Filed Nov. 23, 1955  2 Sheets-Sheet 2
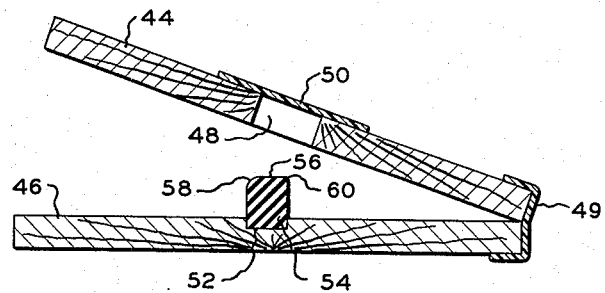
FIG. 3
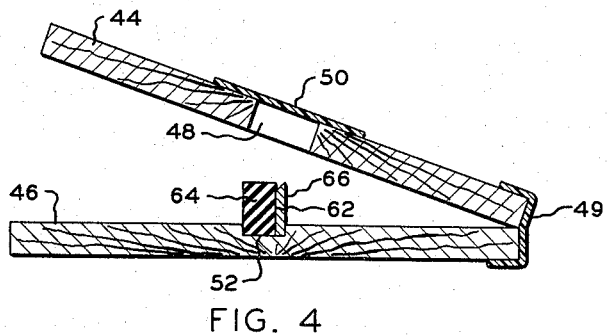
FIG. 4
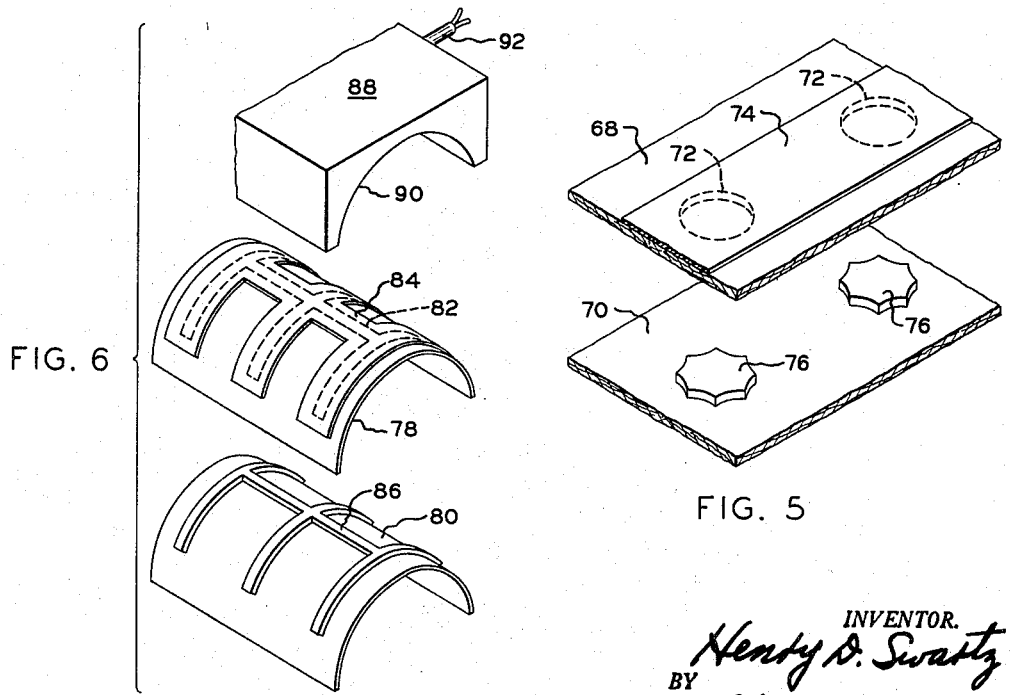
FIG. 6
FIG. 5
INVENTOR.
Henry D. Swartz
BY
Gerald Altman
ATTORNEY United States Patent Office 2,963,072
Patented Dec. 6, 1960

2,963,072

THERMOPLASTIC WELDING DEVICE

Henry D. Swartz, 101 Verndale St., Brookline, Mass., assignor of one-fourth to Gerald Altman, Newton, Mass.

Filed Nov. 23, 1955, Ser. No. 548,669

10 Claims. (Cl. 154—42)

The present invention relates to sealing processes and devices and, more particularly, to processes and devices for joining thermoplastic materials by welding.

The present invention contemplates welding thermoplastic sheets together to provide seals of either simple or complex configuration by means of an exceptionally simple but extremely efficacious construction of great versatility in the home, the factory, etc., for producing and/or sealing bags or other packaging, etc. This construction generally comprises a pair of associated die-like members between which the thermoplastic sheets to be welded are interposed. One of the members is a mask having one or more slots or other openings through which preselected regions of the sheets may be subjected to heat and pressure from a suitable surface, for example, a metallic surface, applied to the mask. The heat-and-pressure surface is prevented from adhering to the sheets or otherwise damaging them by a suitable heat resistant stratum. The other of the members has a ridge or ridges of special design which are adapted to extend into the opening or openings in order to lock the preselected regions of the sheets in place for exposure to the heat-and-pressure surface from which the remaining regions of the sheets are insulated. Preferably, the members are constrained for relative motion toward each other into the predetermined mated positions in which they are designed to operate.

Accordingly, a general object of the present invention is to provide various processes and devices for interposing sections of thermoplastic materials between members provided with at least an opening and at least a ridge, which coact to lock the materials in place and to expose preselected, relatively restricted regions of the materials to heat and pressure from a relatively extended surface through a heat resistant stratum which prevents the surface from damaging the sheets.

A specific object of the present invention is to provide, as a preferred embodiment, a uniquely simple device comprising a pair of pivoted plates, the first providing a ridge and the second providing a slot covered by a strip of heat resistant protective material, between which a pair of thermoplastic sheets may be sealed by a thermostatically controlled, home electric iron applied to the second plate.

Other objects of the present invention will in part be obvious and will in part appear hereinafter.

The invention accordingly comprises the process involving the several steps and the relation and order of one or more of such steps with respect to each of the others and the device possessing the construction, combination of elements and arrangement of parts which are exemplified in the following detailed disclosure, and the scope of which will be indicated in the appended claims.

For a fuller understanding of the nature and objects of the present invention, reference should be had to the followed detailed description taken in connection with the accompanying drawings wherein:

Fig. 3 is a distorted cross-sectional view, analogous to that of Fig. 2, of a modification of the device of Fig. 1;

Fig. 4 is a distorted view, analogous to that of Fig. 2, of another modification of the device of Fig. 1;

Fig. 5 is a fragmentary perspective view of another device embodying the present invention; and Fig. 6 is a perspective view of another device embodying the present invention.

Figure 1:
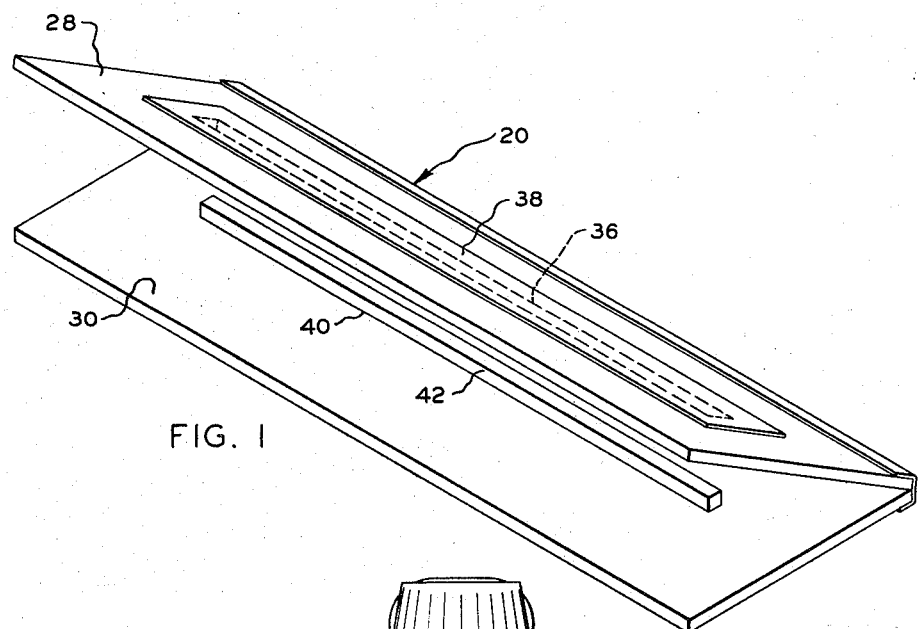
Figure 1 is a perspective view of a preferred device, embodying the present invention, for sealing thermoplastic sheets along a line with the aid of a home electric iron.
Figure 2:
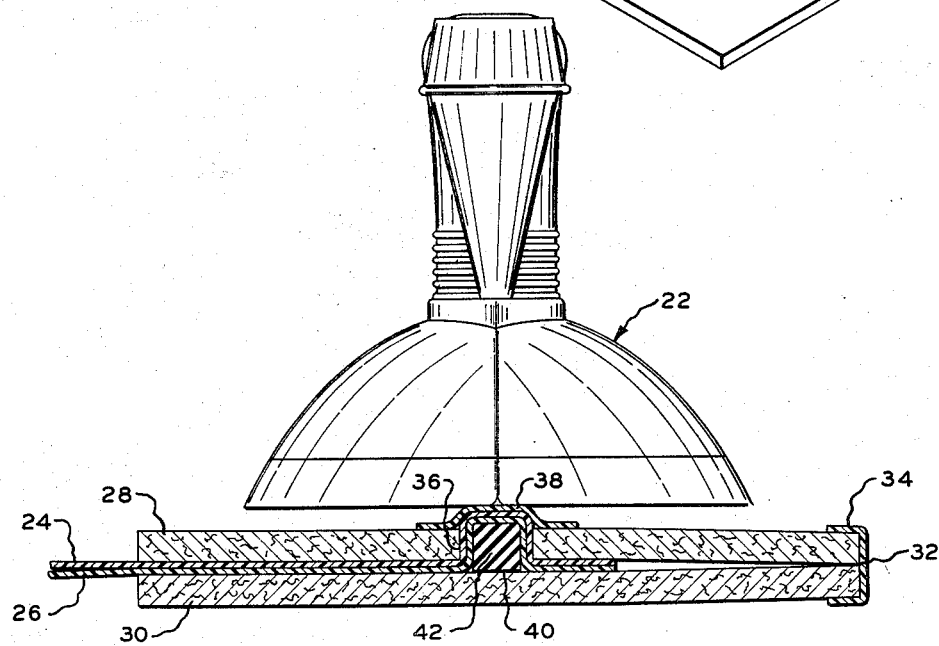
Fig. 2 is a distorted cross-sectional view of the device of Fig. 1 in operation, the section being taken across the device midway between its ends.

The preferred device of Figs. 1 and 2, generally shown at 20, is designed to serve as an accessory for a thermostatically controlled, home electric iron, of the type shown at 22, to provide a pair of thermoplastic sheets 24 and 26 with an elongated narrow seal. Sheets 24 and 26, in one form, are the opposed sections at the open end of a thermoplastic bag containing, for example, food to be hermetically sealed and frozen. This device comprises a pair of pivoted plates 28 and 30, fabricated, for example, from an integral sheet of cardboard, fibreboard, or the like, scored to provide a hinge at 32 which is reinforced by a binding strip 34. Upper plate 28 has an elongated slot 36 of uniform width extending substantially midway between its longitudinal edges. Slot 36 is covered by a thin heat resistant stratum 38. This protective stratum is composed of a material which, in comparison with the thermoplastic of the sheets to be welded, has a high softening or melting point and which will not adhere to the thermoplastic at its welding temperature. In one form, the material of the thermoplastic sheets and material of the protective stratum are incompatible synthetic plastics, i.e., are synthetic plastics which do not form homogeneous mixtures. Where, for example, thermoplastic sheets 24 and 26 are composed of polyethylene such as that sold by Visking under the trade name Visqueen, or of rubber hydrochloride such as that sold by Du Pont under the trade name Pliofilm, stratum 38, for example, is composed of polyethylene terephthalate such as that sold by Du Pont under the trade name Mylar, or tetrafluoroethylene such as that sold by Du Pont under the trade name Teflon. Secured to lower plate 30, for example, by cement 40 is the lower edge of an elongated ridge 42 composed, for example, of a moderately resilient rubber-like material such as natural rubber or neoprene. The slot and the ridge are generally similar in peripheral outline. The width of ridge 42 is slightly less than the width of slot 36 and the distance from the upper face of plate 30 to the upper edge of ridge 42 is slightly greater than the thickness of upper plate 28.

In operation, when sheets 24 and 26, composed of such a material as polyethylene or rubber hydrochloride referred to above, are interposed between plates 28 and 30 and the plates are clamped firmly together, slot 36 and ridge 42 coact to stretch sheets 24 and 26 in a thin elongated region. When iron 22, at a temperature in the vicinity of the melting point polyethylene or rubber hydrochloride, e.g. at a temperature ranging from 200 to 450° F., is applied to plate 28 for a period ranging from 1 to 5 seconds, heat and pressure are transmitted to the thin elongated region encompassed by slot 36 and are excluded from the remaining regions of the sheets by the solid portions of plate 28. The sheets, in this manner, are provided with a uniform seal which is as strong as the sheets themselves.

The devices of Figs. 3 and 4 are designed to provide a pair of thermoplastic sheets with a seal in the manner of the device of Figs. 1 and 2, and in addition to separate sections of the sheets including the seal from the remaining sections by cutting the sheets along one edge of the seal. Each of the devices of Figs. 3 and 4 comprises a pair of pivoted plates 44 and 46 composed of an insulating material such as wood or one of the materials mentioned in reference to plates 28 and 30 of Figs. 1 and 2. Upper plate 44 has an elongated slot 48 which is covered by a protective stratum 50 in Figs. 3 and 4. Lower plate 46 has a groove 52 which in Fig. 3 snugly receives the lower edge of an integral elongated ridge 54 and in Fig. 4 a two-component ridge 62. Ridge 54 is composed of a rigid material such as metal. Its upper edge is medially flat as shown at 56 to provide an adequate sealing area, is rounded at one corner as shown at 58 to prevent cutting at one edge of the seal, and is sharp at the other corner as shown at 60 to ensure cutting at the other edge of the seal. Ridge 62 includes a resilient component 65 composed, for example, of a rubberlike material such as natural rubber or neoprene and a rigid component 66 composed, for example, of metal. Resilient component 64 provides a suitable sealing area and the sharp upper edge of rigid component 66 ensures cutting at one edge of the seal. Although, corner 60 of ridge 54 and the upper edge of component 66 of ridge 62 are shown as being continuously sharp, in another form they are intermittently notched for perforating rather than cutting the sheets along one edge of the seal. The relative dimensions in the devices of Figs. 3 and 4 of the width and height of each ridge, the width of the slot and the thickness of the upper plate are similar to those in the device of Figs. 1 and 2.

The device of Fig. 5 is designed to provide a pair of plastic sheets with intermittent welded regions of desired shape. This device comprises a pair of plates 68 and 70, circular openings 72 covered by a single protective stratum 74, and plate 70 carrying a plurality of cusped disks in alignment with the openings. Like their counterparts in Figs. 1 and 2, disks 76 are slightly greater in height and slightly smaller in peripheral extent than openings 72. Although, openings 72 are not identical in shape to disks 76, they are generally similar in shape and extent so that they are capable of clamping sheets to be welded tightly over the disks to provide distinct cusped contours which circumscribe regions of the sheets to be welded.

Fig. 6 illustrates a device comprising similarly curved die-like members that are slotted and ridged in accordance with the present invention to form seals of three dimensional configuration under heat and pressure from a similarly shaped curved metallic surface. This device comprises members 78 and 80 of cylindrical shape composed, for example, of fibrous glass cloth resin or papier-mache. Member 78 has a three-dimensional slot 82 covered by a protective stratum 84. Member 80 has a three-dimensional ridge 86 similar to slot 82 in shape and extent. Like their counterparts in Figs. 1 and 2, ridge 86 is slightly greater in height and slightly smaller in peripheral extent than slot 82. A heater 88 provided with a cylindrical heat-and-pressure applying surface 90 is powered by a suitable source of electricity 92. The device of Fig. 6 is designed to provide relatively rigid thermoplastic sheets with a ribbed seal which imparts to the welded section of the sheets a permanent cylindrical shape.

The present invention thus provides an exceptionally simple but extremely effective technique of great versatility for producing simple or complex thermoplastic seals in configurations of one-, two- and three-dimensions.

Since certain changes may be made in the above process and device without departing from the scope of the invention herein involved, it is intended that all matter contained in the above description and shown in the accompanying drawing shall be interpreted in an illustrative and not in a limiting sense.

I claim as my invention:

1. A device for welding thermoplastic materials, said device comprising a first member providing at least an opening and a second member providing at least a ridge, means for constraining said first member and said second member for relative movement of said slot and said ridge into mated positions in order to collocate predetermined regions of thermoplastic materials interposed between said first member and said second member, and a protective stratum covering said opening, said protective stratum being adapted to transmit heat and pressure from a surface applied to said first member in order to produce a seal in said predetermined regions of said materials while protecting them from damage, said first member being constructed to insulate other regions of said materials from said surface.

2. The device of claim 1 wherein said slot and said ridge lie along straight lines, in order to produce a straight seal.

3. The device of claim 1 wherein said slot and said ridge lie along curved lines in order to produce a curved seal.

4. The device of claim 1 wherein said slot and said ridge are generally similar in peripheral shape and extent.

5. The device of claim 1 wherein at least a component of said ridge is sharp and rigid in order to separate regions of said sheets from other regions of said sheets at an edge of said seal.

6. A device for welding thermoplastic sheets, said device comprising a heat insulating mask and means providing a clamping surface, said heat insulating mask providing a slot therethrough, a ridge extending from said clamping surface, means for constraining said mask and said clamping surface for relative movement of said slot and said ridge into mated positions in order to collocate predetermined regions of thermoplastic sheets interposed between said mask and said clamping surface, said mask and said clamping surface being of generally similar contour, and a protective stratum covering said opening, said protective stratum being adapted to transmit heat and pressure from a surface applied to said mask in order to produce a seal in said predetermined regions of said sheets while protecting them from damage, said first member being constructed to insulate other regions of said materials from said surface.

7. The device of claim 6 wherein said contour is flat.

8. The device of claim 6 wherein said contour is curved.

9. A device for welding thermoplastic sheets, said device comprising a pair of plates, one plate providing a slot, a ridge extending from the other plate, a hinge for pivoting said plates for relative movement of said slot and said ridge into mated positions in order to expose plastic sheets interposed between said plates to heat and pressure from a surface applied to said one plate, a heat resistant stratum covering said slot to protect said sheet from damage from said surface.

10. The device of claim 9, wherein said ridge is slightly greater in height and slightly smaller in peripheral extent than said slot.

References Cited in the file of this patent

UNITED STATES PATENTS

| 1,899,067 | Trumbull | Feb. 28, 1933 |
| 2,421,373 | Cozza | June 3, 1947 |
| 2,424,558 | Delano | July 29, 1947 |
| 2,524,584 | Zehr | Oct. 3, 1950 |
| 2,556,008 | Spalding | June 5, 1951 |
| 2,556,452 | Spalding | June 12, 1951 |
| 2,574,094 | Fener et al. | Nov. 6, 1951 |
| 2,625,201 | Smith | Jan. 13, 1953 |
| 2,638,964 | Andina | May 19, 1953 |
| 2,758,631 | Peterson et al. | Aug. 14, 1956 |
| 2,785,728 | Smith | Mar. 19, 1957 |

FOREIGN PATENTS

| 153,868 | Australia | Nov. 29, 1951 |
| 156,270 | Australia | Oct. 29, 1953 |